United States Patent
Pellmann et al.

(10) Patent No.: US 9,340,233 B2
(45) Date of Patent: May 17, 2016

(54) METHOD FOR PRODUCING A HOT-FORMED AND PRESS-HARDENED METAL COMPONENT

(75) Inventors: Markus Pellmann, Sassenberg (DE); Johannes Böke, Blomberg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 1079 days.

(21) Appl. No.: 13/230,138

(22) Filed: Sep. 12, 2011

(65) Prior Publication Data

US 2012/0090741 A1 Apr. 19, 2012

(30) Foreign Application Priority Data

Oct. 15, 2010 (DE) .................. 10 2010 048 209

(51) Int. Cl.
| | |
|---|---|
| *B62D 25/04* | (2006.01) |
| *B62D 25/08* | (2006.01) |
| *C21D 1/20* | (2006.01) |
| *C21D 1/673* | (2006.01) |
| *C21D 8/02* | (2006.01) |
| *C21D 8/04* | (2006.01) |
| *C22C 1/02* | (2006.01) |
| *C22C 38/02* | (2006.01) |
| *C22C 38/04* | (2006.01) |
| *C22C 38/06* | (2006.01) |
| *C22C 38/14* | (2006.01) |
| *C22C 38/32* | (2006.01) |
| *C21D 8/00* | (2006.01) |

(52) U.S. Cl.
CPC ............... *B62D 25/04* (2013.01); *B62D 25/08* (2013.01); *C21D 1/20* (2013.01); *C21D 1/673* (2013.01); *C21D 8/005* (2013.01); *C21D 8/0205* (2013.01); *C21D 8/04* (2013.01); *C22C 1/02* (2013.01); *C22C 38/02* (2013.01); *C22C 38/04* (2013.01); *C22C 38/06* (2013.01); *C22C 38/14* (2013.01); *C22C 38/32* (2013.01); *C21D 2211/002* (2013.01); *C21D 2211/008* (2013.01); *C21D 2221/00* (2013.01)

(58) Field of Classification Search
CPC ........ B62D 25/04; B62D 25/08; C21D 8/005; C21D 8/0205; C21D 8/04; C21D 1/20; C21D 1/673; C21D 2211/002; C21D 2211/008; C21D 2221/00; C22C 38/02; C22C 38/04; C22C 38/06; C22C 38/14; C22C 38/32; C22C 1/02
USPC ....................................................... 148/643
See application file for complete search history.

(56) References Cited

U.S. PATENT DOCUMENTS

| | | | |
|---|---|---|---|
| 6,149,743 | A | 11/2000 | Lund et al. |
| 6,270,555 | B1 | 8/2001 | Wood et al. |
| 2002/0104591 | A1 | 8/2002 | Gehringhoff et al. |
| 2004/0060623 | A1 | 4/2004 | Boke et al. |
| 2005/0173026 | A1 | 8/2005 | Taniguchi et al. |
| 2006/0137780 | A1 | 6/2006 | Beguinot et al. |
| 2007/0261769 | A1 | 11/2007 | Bodin |
| 2010/0095733 | A1 | 4/2010 | Salamon et al. |
| 2010/0199737 | A1 | 8/2010 | Pellmann et al. |
| 2010/0300584 | A1 | 12/2010 | Buschsieweke et al. |

FOREIGN PATENT DOCUMENTS

| | | |
|---|---|---|
| CN | 1539026 | 10/2004 |
| CN | 1714160 | 12/2005 |
| CN | 1802225 | 7/2006 |
| DE | 200 14 361 U1 | 8/2002 |
| DE | 102 08 216 | 3/2003 |
| DE | 10 2007 057 855 B3 | 10/2008 |
| DE | 10 2008 022 401 A1 | 11/2009 |
| DE | 102008022399 | 11/2009 |
| DE | 10 2008 034 596 A1 | 2/2010 |
| EP | 2 012 948 B1 | 9/2009 |
| WO | WO 2006/038868 A1 | 4/2006 |
| WO | WO 2008/104360 A1 | 9/2008 |
| WO | WO 2009/067976 A1 | 6/2009 |
| WO | WO 2010/076247 A1 | 7/2010 |

OTHER PUBLICATIONS

Ebner Industrieofenbau GmbH, Austria: "Steel Strip Hardening and Tempering Lines", Apr. 1994.
Thomas Troester et al."Innovative Wanmumformung" in "Neuere Entwicklungen in der Blechumformung", papers of the International Conference on New Developments in Sheet Metal Forming Fellbach, Germany, May 11-12, 2004, p. 51-66, XP009130353.
Philipp Hein et al."Status and Innovation Trends in Hot Stamping of USIBOR 1500 P", Steel Research International, publisher: Verlag Stahleisen GmbH, Duesseldorf, Germany, vol. 79, No. 2, Feb. 1, 2008, p. 85-91, XP009101799.
Thomas Ausmann "Hot Stamp Technologies—TRB", Sep. 15, 2010, XP002668592, found under http://us.aptgroup.com/19946/40358/BentelerAutomotive.pdf.

*Primary Examiner* — Roy King
*Assistant Examiner* — Caitlin Kiechle
(74) *Attorney, Agent, or Firm* — Henry M. Feiereisen LLC

(57) ABSTRACT

The present invention relates to a method for producing a hot-formed and press-hardened metal component for an automobile having at least two regions of different hardness. A hardenable sheet-metal blank is heated to at least an austenizing temperature and a first region of the sheet-metal blank is intermediately cooled at a cooling speed greater than the lower critical cooling speed of the material of the sheet-metal blank. The sheet-metal blank is then hot-formed and press-hardened in a press-hardening tool by quenching the first region from a bainitic structure transformation stage, thereby adjusting a mixed structure of martensite and bainite in the first region.

5 Claims, 1 Drawing Sheet

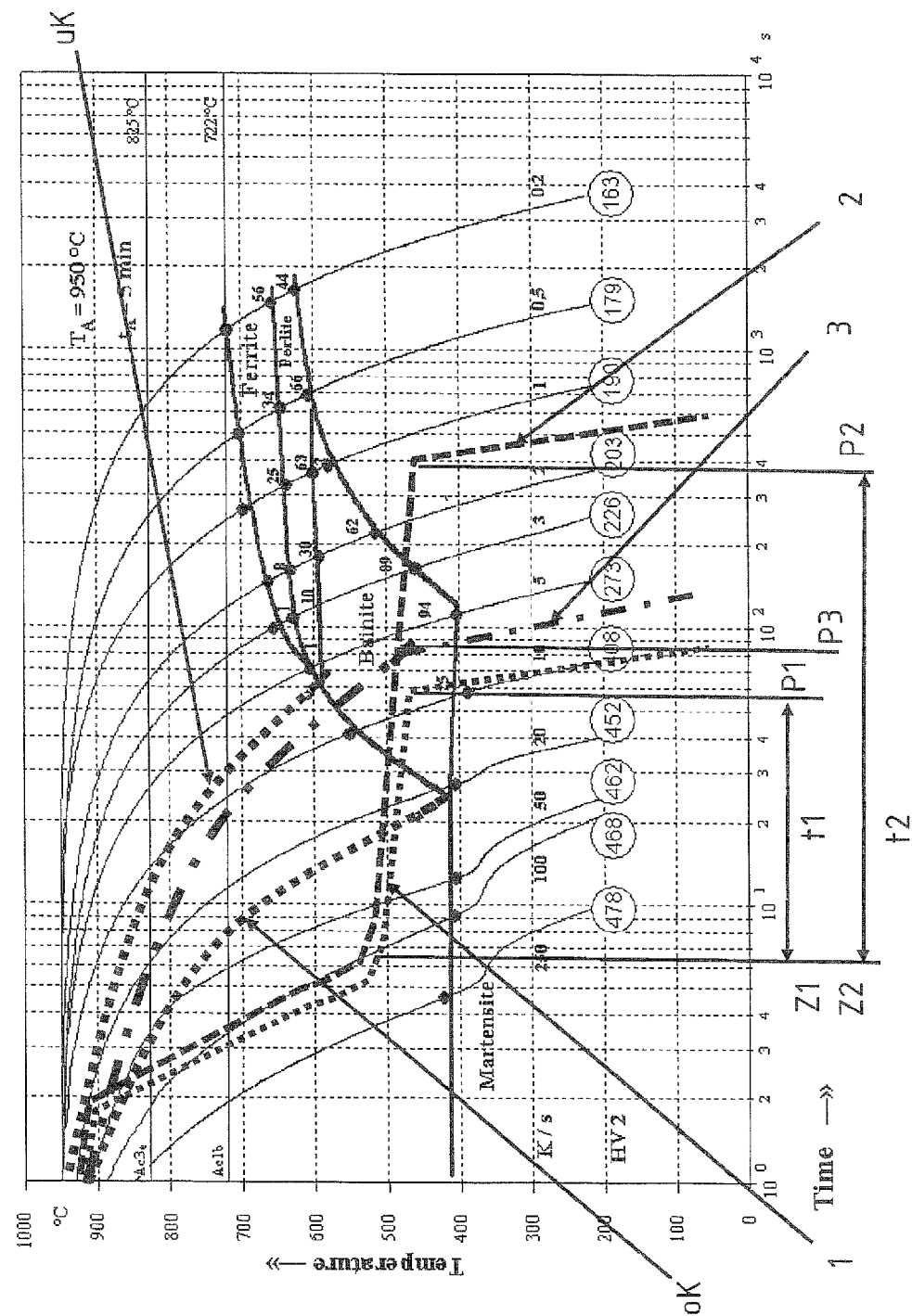

METHOD FOR PRODUCING A HOT-FORMED AND PRESS-HARDENED METAL COMPONENT

CROSS-REFERENCES TO RELATED APPLICATIONS

This application claims the priority of German Patent Application, Serial No. 10 2010 048 209.9, filed Oct. 15, 2010, pursuant to 35 U.S.C. 119(a)-(d), the content of which is incorporated herein by reference in its entirety as if fully set forth herein.

BACKGROUND OF THE INVENTION

The present invention relates to a method for producing a hot-formed and press-hardened metal component for an automobile.

The following discussion of related art is provided to assist the reader in understanding the advantages of the invention, and is not to be construed as an admission that this related art is prior art to this invention.

The currently used requirement profile for structural automobile components demands that the components have a particularly low weight while simultaneously enabling intentional adjustment of regions of tensile strength. The low weight of the components contributes to a reduction of the overall weight of the automobile, which in turn has advantages for fuel consumption and $CO_2$ emission.

The intentionally adjustable regions of tensile strength of the structural automobile component are hereby used, on one hand, to specifically reduce the weight with the same stiffness and, on the other hand, to intentionally adjust the ductility in certain regions, thereby increasing the crash safety of the overall automobile body for improved protection of the occupants.

Various hot-forming and press-hardening methods for producing metal components with high tensile strength characteristics and low weight are known in the art. In particular, post-treatment methods of a hot-formed and press-hardened metal component for intentionally adjusting partial regions of tensile strength are known in the art. For example, such regions are produced by inductive post-heating, tempering and the like, thereby creating ductile material properties. Such post-processing steps have the disadvantage that the production costs become relatively high due to the post-treatment operations. Moreover, performing such subsequent operations requires at least two process steps with frequently different tools. This results in long production times of such heat post-treated automobile component.

It would therefore be desirable and advantageous to obviate prior art shortcomings and to provide an improved method for producing structural automobile components having regions of different strength.

SUMMARY OF THE INVENTION

According to one aspect of the present invention, a method for producing hot-formed and press-hardened metal component for an automobile having at least two regions of different hardness includes the steps of providing a hardenable sheet-metal blank which is heated to at least an austenizing temperature, intermediately cooling a first region of the sheet-metal blank, wherein the cooling speed is selected to be greater than the lower critical cooling speed of the material of the sheet-metal blank, and in a press-hardening tool hot-forming and press-hardening the sheet-metal blank into the metal component, wherein the first region is quenched in the press-hardening tool from a bainitic structural transformation stage, thereby adjusting in the first region a mixed structure of martensite and bainite.

With the method of the invention, an intermediate stage structure is adjusted under time control and/or temperature control. In particular, the intermediate stage structure is adjusted in the first region of the sheet-metal blank through intermediate cooling. The cooling speed of the intermediate cooling is hereby selected within the context of the invention so that as to be located above the lower critical cooling speed of the material of the sheet-metal blank. The cooling speed is thus greater than the lower critical cooling speed. In particular, regions are cooled which should become soft after press-hardening, i.e., having higher ductility. The cooling process of the intermediate cooling is hereby performed after the hardenable sheet-metal blank has been heated to the austenizing temperature; however, the cooling process may also be performed within the context of the invention before or during the hot-forming and press-hardening process. In particular, if the cooling process of the intermediate cooling is performed during press-hardening, a suitable means is to be provided in the press tool which enables realization of a corresponding cooling and also of corresponding cooling speeds.

If the intermediate cooling is performed before hot-forming and press-hardening, then this implies a production line with corresponding intermediate transfers of the sheet-metal blank that was heated above the austenizing temperature.

The cooling itself may be performed, for example, through free convection, with cooling rollers, with one-sided tempering plates having an insulating counter layer or with other suitable cooling devices. The cooling speed during intermediate cooling may be between 200 Kelvin/second and 5 Kelvin/second, preferably 50 Kelvin/second. Cooling may take place immediately after removal from the furnace, in this way, the strength values in the first regions may be adjusted to between 550 and 900 MPa, preferably to substantially 700 MPa.

In addition, an intermediate structure region cooled down to the cooling temperature may be further quenched in the press-hardening tool itself from the bainitic structure, so that a mixed structure of martensite and bainite is adjusted in the first region. By quenching the first region, where the structure has an intermediate stage, the residual austenitic fractions are transformed to martensitic fractions during press-hardening. A martensitic-bainitic mixed structure is then produced in the first regions. The fractions of bainite in relation to martensite depend in turn of the duration during which the first region is held at the intermediate stage, before the press-hardening process starts.

According to one advantageous feature of the present invention, a second region may be held above the austenizing temperature, wherein the second region may be any region of the sheet-metal blank not included in the first region. In other words, a corresponding temperature above the austenizing temperature may be maintained after the sheet-metal blank is heated to at least the austenizing temperature. This may be attained, for example, actively with external heat sources or passively through suitable isolation.

When using external heat sources, the temperature in the second region may be held in particular using infrared lamps, heating coils, porous burners, insulating plates or similar external heat sources. Within the context of the invention, a temperature significantly above the austenizing temperature may be selected so as to match the time between the end of heat-up above the austenizing temperature and the start of the press-hardening process and the ensuing cooling to one another so that at the start of the press-hardening process, the second region is still at a temperature which is at least above the austenizing temperature.

According to another advantageous feature of the present invention, the cooling speed during intermediate cooling of the first region may be selected so that a bainitic structure is obtained, preferably to a temperature between 600 and 400° C., in particular to 500° C. At cooling speeds which are greater than the lower critical cooling speed of the respective employed material, but stop above the martensitic start temperature, the so-called bainitic formation takes place when the cooling temperature is held isothermally, which is also known as intermediate structure or intermediate stage.

Unlike with conventional processes, where perlite or ferrite is formed, wherein the perlite is substantially formed directly from the austenite through diffusion, diffusion of carbon in the austenite is severely inhibited in the intermediate stage of the bainite as a result of the more rapid cooling. During bainite formation, small austenitic regions transform mostly into a distorted alpha lattice, starting from grain boundaries. Because the diffusion speed in the alpha lattice is significantly greater than in the gamma lattice, small cementite grains precipitate in these alpha mixed crystals which are oversaturated with carbon, wherein the size of the cementite grains decreases with increasing cooling speed. This produces a substantially needle-like structure of the bainitic structure. This also produces a grainy structure of the carbides because the hardness increases with increasing grain fineness. The bainitic structure is further differentiated by an upper intermediate stage, where the carbide are combined for increased in-migration, and a lower intermediate stage where the carbides are very finely distributed.

According to another advantageous feature of the present invention, the first region may be held at the cooling temperature of the intermediate cooling for a predetermined time, wherein the temperature may preferably be held isothermally. With this embodiment, the bainitic intermediate structure may be precisely adjusted to the respective required or desired strength values. In this embodiment, the intermediate cooling may be performed essentially to a temperature where the structure of the material of the first region is transformed into austenite or is transformed directly into the intermediate structure. Starting from this cooling temperature, an additional transformation of the material structure occurs through isothermal holding for a certain time. The material is then transformed from an austenitic structure to a bainitic structure. A mixed structure between austenite and bainite may already be adjusted by cooling the material directly to the intermediate stage by selecting the cooling speed. A purely bainitic transformation structure region is maintained for a certain time by holding at the cooling temperature. The longer the first region is held at this temperature, the greater is the bainitic fraction of the structure.

According to yet another advantageous feature of the present invention, the first region may be isothermally held until the first region is completely transformed into bainite. A material structure is hereby attained which has a higher strength than a ferrite-perlite structure. More particularly, this approach intentionally avoids a perlite structure which may otherwise reduce the ductility.

According to still another advantageous feature of the present invention, the cooling speed during intermediate cooling may be selected to be above the upper critical cooling speed of the employed material. In this way, an austenitic region may be intentionally adjusted, which is subsequently held, preferably isothermally, at a temperature level during a predetermined time, thereby intentionally adjusting the transformation of the structure during the holding time to be bainitic. Depending on the employed holding time, a partially bainitic-austenitic structure or an exclusively bainitic structure can be adjusted. In the case of a bainitic-austenitic structure, the bainitic-austenitic structure is transformed into a bainitic-martensitic structure by the subsequent press-hardening process.

In the context of the invention, holding at a substantially uniform temperature below the ferrite and perlite temperature is to be understood as substantially below 600° C., in particular below 550° C., but above a martensite start temperature. For example, during isothermal holding over a longer time interval, the temperature may decrease from 500° C. to 400° C., which in the context of the present invention is still being viewed as essentially isothermal. The first region may be held isothermally during a time interval from 1 second to 80 seconds, preferably for 15 seconds. However, this selection is based on the employed material alloy.

According to another advantageous feature of the present invention, the intermediate cooling of the first region may performed in the press-hardening tool, preferably by using the cooling plates arranged in the press-hardening tool. This reduces the cycle times and also the production costs. In particular, an automobile component with regions of different strength can thus be produced in only two tool steps. Initial heating is performed in a furnace, while a combined intermediate cooling and hot-forming and press-hardening is subsequently performed in a single tool.

A cooling speed of at least 25 Kelvin/seconds, particularly a cooling speed of greater than 27 Kelvin/seconds, may be selected for the cooling speed during the actual press-hardening process. More particularly, higher cooling speeds may be selected for the actual press-hardening process. The press-hardening process may be performed with the same cooling speed in both the first region and the second region. However, the cooling speed between the first region and the second region may still slightly diverge due to the different temperatures at the start of the press-hardening process in the two regions.

Preferably, a hardenable steel categorized as micro-alloyed tempered steel is used with the method of the invention. This steel has particularly the following alloy element fractions (in weight percent):

| Carbon | (C) | 0.19 to 0.25 |
| Silicon | (Si) | 0.15 to 0.30 |
| Manganese | (Mn) | 1.10 to 1.40 |
| Phosphorus | (P) | 0 to 0.025 |
| Sulfur | (S) | 0 to 0.015 |
| Chromium | (Cr) | 0 to 0.35 |
| Molybdenum | (Mo) | 0 to 0.35 |
| Titanium | (Ti) | 0.020 to 0.050 |
| Boron | (B) | 0.002 to 0.005 |
| Aluminum | (Al) | 0.02 to 0.06. |

Within the context of the invention, a tool with integrating cooling plates may be used for intermediate cooling of the first regions. The cooling plates may have an intrinsic temperature reaching 600° C., which however is colder than the $AC_3$ temperature of more than 900° C. The first region may be cooled with these cooling plates and then, as needed, also held isothermally during a time interval. For example, such cooling plates may be brought to the respective required temperature with electric heater cartridges or by heating with back-side burners or by heating with thermal oils.

According to another advantageous feature of the present invention, substantially cold cooling plates may be employed for the intermediate cooling. The plates may then have a temperature of between −100° C. and +100° C., preferably between −10° C. and +25° C. However, an isothermal holding time with cold cooling plates is possible only in a limited way. According to an advantageous embodiment, both versions of cooling plates may be integrated, for example, in a hot-forming tool or a press tool, so that the entire process may be performed in a single tool following the actual furnace heating. In the context of present invention, the cooling plates for performing the intermediate cooling may also be housed in a separate tool, so that the process takes place from the heating furnace via the intermediate cooling to the actual hot-forming and press-hardening tool.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a time-temperature diagram of an exemplary steel according to the present invention.

DETAILED DESCRIPTION OF PREFERRED EMBODIMENTS

FIG. 1 shows a time-temperature diagram of an exemplary steel, without limiting the application of the present invention. The different structures attained with the material at the cooling speeds of a function of temperature are shown. The lower section of FIG. 1 shows the martensite formation; thereabove in the center section of the FIG. 1 the bainite formation, and again thereabove in FIG. 1 the perlite and/or ferrite formation.

In the illustrated exemplary embodiment, three different curves for different cooling processes are shown. Curve 1 shows the temperature dependence for a first region, which is initially heated to a temperature above the $AC_3$ temperature. The material is then cooled from this temperature to an intermediate temperature of about 520° C. with a cooling speed which in this case is greater than the upper critical cooling speed oK of the illustrated material. When the cooling temperature of the intermediate cooling of above about 520° C. is reached, the first region is isothermally held at a temperature for the time duration t1. The temperature thereby decreases from about 520° C. to about 480° C. due to heat dissipation in form of, for example, heat radiation, convection, but also heat conduction. Accordingly, cooling an austenitic structure is produced at the time Z1 of the intermediate, and a bainitic-austenitic mixed structure at a time P1, corresponding to the start of press-hardening in the first embodiment.

In the first embodiment, quenching is then performed by the press-hardening process from the time P1 on, thereby transforming the bainitic-austenitic mixed structure in the first region into a bainitic-martensitic mixed structure. In parallel, the second region is quenched through press-hardening from a temperature above $AC_3$, thereby producing a martensitic structure directly from an austenitic structure, which however is not illustrated in more detail for sake of clarity.

A second embodiment of the method of the invention is illustrated with the cooldown of the first region corresponding to curve 2. The cooldown of curve 2 substantially follows the cooling curve 1, wherein the cooling temperature is held for a longer time from a time Z2 on (equal to Z1), so that the press-hardening process starts at a time P2. Accordingly, the time interval t2 is greater than t1. The structure in the first region is completely transformed into bainite at the time P2, so that no further structural transformation due to the cooling speed takes place after the time P2.

In a third embodiment according to the present invention, the cooling speed is selected from a temperature above the $AC_3$ temperature according to curve 3, so that the material is during the cooling process of the intermediate cooling transformed directly into the bainitic intermediate structure. In this case, an austenitic-bainitic intermediate structure was adjusted in the first region, so that at the start of the press-hardening process at the time P3 this bainitic-austenitic mixed structure is transformed into a bainitic-martensitic mixed structure in the first region. In the embodiments according to curve 2 and curve 3, the respective second region which is held during the intermediate cooling above the $AC_3$ temperature is transformed directly from the austenitic region into martensite during cooldown in the press-hardening process. According to the invention, the temperature in the embodiment according to curve 3 is selected to be always greater than the lower critical cooling speed uK of the respective employed material.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for producing a hot-formed and press-hardened metal component for an automobile, said metal component having at least two regions of different hardness, the method comprising the steps of:
   Heating a hardenable sheet-metal blank to at least an austenizing temperature,
   Intermediately cooling a first region of the heated sheet-metal blank with a cooling speed selected to be greater than a lower critical cooling speed of a material of the sheet-metal blank to a cooling temperature,
   Holding the first region at the cooling temperature isothermally for a predetermined time, thereby forming a bainitic-austenitic mixed structure in the first region,
   Holding a second region of the metal component above the austenizing temperature until the metal component is conveyed to a press-hardening tool and
   In the press-hardening tool, hot-forming and press-hardening the intermediately cooled sheet-metal blank to the metal component by quenching a first region of the metal component in the press-hardening tool from a bainitic structural transformation stage, thereby adjusting in the first region a mixed structure of martensite and bainite.

2. The method of claim 1, wherein the first region is cooled to a cooling temperature between 600 and 400° C.

3. The method of claim 1, wherein the first region is cooled to a cooling temperature of about 500° C.

4. The method of claim 1, wherein the cooling speed of intermediate cooling is selected to be greater than an upper critical cooling speed of a material of the sheet-metal blank.

5. The method of claim 1, wherein the intermediate cooling is performed using cooling plates.

* * * * *